(12) United States Patent
Gollmer et al.

(10) Patent No.: US 10,428,934 B2
(45) Date of Patent: Oct. 1, 2019

(54) HYDRAULIC CONTROLLER FOR AN ACTUATOR IN A VEHICLE GEARBOX

(71) Applicant: Bayerische Motoren Werke Aktiengesellschaft, Munich (DE)

(72) Inventors: Roland Gollmer, Diessen (DE); Sebastian Liebert, Unterfoehring (DE); Thomas Heider, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 135 days.

(21) Appl. No.: 15/805,500

(22) Filed: Nov. 7, 2017

(65) Prior Publication Data

US 2018/0066747 A1 Mar. 8, 2018

Related U.S. Application Data

(63) Continuation of application No. PCT/EP2016/063595, filed on Jun. 14, 2016.

(30) Foreign Application Priority Data

Jun. 30, 2015 (DE) .................. 10 2015 212 101

(51) Int. Cl.
*F04C 14/22* (2006.01)
*F15B 15/14* (2006.01)
(Continued)

(52) U.S. Cl.
CPC ......... *F16H 61/0031* (2013.01); *F04C 14/22* (2013.01); *F15B 15/14* (2013.01);
(Continued)

(58) Field of Classification Search
CPC .. F15B 2211/292; F15B 11/022; F15B 15/14; F16H 61/0025; F16H 61/0031
See application file for complete search history.

(56) References Cited

U.S. PATENT DOCUMENTS

2003/0158009 A1  8/2003  Berger et al.
2005/0263352 A1  12/2005  Fideler et al.
(Continued)

FOREIGN PATENT DOCUMENTS

DE        42 01 692 A1    8/1992
DE  10 2004 025 764 A1    5/2006
(Continued)

OTHER PUBLICATIONS

International Search Report (PCT/ISA/210) issued in PCT Application No. PCT/EP2016/063595 dated Sep. 8, 2016 with English translation (Six (6) pages).
(Continued)

*Primary Examiner* — Michael Leslie
*Assistant Examiner* — Daniel S Collins
(74) *Attorney, Agent, or Firm* — Crowell & Moring LLP

(57) ABSTRACT

A hydraulic controller for a vehicle gearbox is provided. The controller includes a hydraulic actuator which has an oil supply port, a high-pressure hydraulic pump for providing a feed to a high-pressure line, a low-pressure hydraulic pump for providing a feed to a low-pressure line, a hydraulic reservoir for receiving the hydraulic medium from a return line, and a hydraulic control valve. The control valve includes at least three control positions and at least four valve ports. In a first control position, the high-pressure line is fluidly connected to the oil supply port for the regulation of the actuating force of the hydraulic actuator. In a second control position, the low-pressure line is fluidly connected to the oil supply port for the pre-charging of the hydraulic actuator. In a third control position, the hydraulic actuator is fluidly connected to the return line for the return of the hydraulic medium.

19 Claims, 4 Drawing Sheets

(51) Int. Cl.
*F16H 61/00* (2006.01)
*F16H 57/04* (2010.01)

(52) U.S. Cl.
CPC ..... *F16H 57/0435* (2013.01); *F16H 57/0436* (2013.01); *F16H 61/0025* (2013.01); *F16H 2306/36* (2013.01)

(56) References Cited

U.S. PATENT DOCUMENTS

2008/0247882 A1 10/2008 Earhart et al.
2011/0319227 A1 12/2011 Kamada et al.
2013/0037144 A1* 2/2013 Fuller ................. F16H 61/0025
                                                    137/565.29

FOREIGN PATENT DOCUMENTS

| DE | 10 2004 058 261 A1 | 6/2006 |
|---|---|---|
| DE | 103 06 963 A1 | 8/2006 |
| DE | 10 2006 055 184 A1 | 5/2008 |
| DE | 10 2008 016 499 A1 | 10/2008 |
| DE | 10 2009 050 462 A1 | 4/2011 |
| DE | 10 2011 105 456 A1 | 12/2011 |
| DE | 10 2011 100 801 A1 | 11/2012 |
| DE | 10 2013 214 758 A1 | 1/2015 |
| GB | 2 252 369 A | 8/1992 |
| WO | WO 2011/104533 A1 | 9/2011 |

OTHER PUBLICATIONS

German-language Written Opinion (PCT/ISA/237) issued in PCT Application No. PCT/EP2016/063595 dated Sep. 8, 2016 (Four (4) pages).
German-language Office Action issued in counterpart German Application No. 10 2015 212 101.1 dated Mar. 15, 2016 (Six (6) pages).
German-language Office Action issued in counterpart German Application No. 10 2015 212 101.1 dated May 24, 2017 (Three (3) pages).
German-language Office Action issued in counterpart German Application No. 10 2015 212 101.1 dated Dec. 4, 2017 (2 pages).

* cited by examiner

HYDRAULIC CONTROLLER FOR AN ACTUATOR IN A VEHICLE GEARBOX

CROSS REFERENCE TO RELATED APPLICATIONS

This application is a continuation of PCT International Application No. PCT/EP2016/063595, filed Jun. 14, 2016, which claims priority under 35 U.S.C. § 119 from German Patent Application No. 10 2015 212 101.1, filed Jun. 30, 2015, the entire disclosures of which are herein expressly incorporated by reference.

BACKGROUND AND SUMMARY OF THE INVENTION

The invention relates to a hydraulic control system for an actuator in a vehicle gearbox and also to a method of operating a control system of this kind. Hydraulic control systems of this kind are known from DE 10 2008 016 499 A1.

The invention is described below in connection with a gearbox for a passenger car. However, this should not be regarded as a limitation on the invention. A general goal of automotive engineering is that of increasing efficiency. There is substantial potential for efficiency improvements in the area of secondary consumers. This also includes the hydraulic actuation of clutches and brakes in a vehicle gearbox, in particular in an automatic or automated gearbox.

It is known from the state of the art, in particular from DE 10 2008 016 499 A1, for at least two circuits to be provided to supply a vehicle gearbox, one of which is a high-pressure circuit and the other of which is a low-pressure circuit. The high-pressure circuit is provided to interact with the hydraulic actuators, in particular the clutches and brakes for gear-changing, and the low-pressure circuit is provided to supply lubricating oil and for gearbox cooling.

A problem addressed by the invention is that of specifying a hydraulic control system for a motor vehicle gearbox, wherein the efficiency of this control system is improved.

This and other objects are achieved by a hydraulic control system and also by a method for operating such a hydraulic control system in accordance with embodiments of the invention.

This kind of hydraulic control system for a vehicle gearbox is set up to control the actuating force of at least one hydraulic actuator that can be actuated by a hydraulic medium. The hydraulic actuator, preferably a hydraulic cylinder for exerting an actuating force on the friction linings of a clutch or brake, as these are provided to bring about a gear change in a vehicle gearbox, has at least one oil supply port. Actuators of this kind preferably have an additional return port with which the hydraulic medium can move back in the direction of the hydraulic tank following actuation; more preferably, the oil supply port is also simultaneously configured as a return port. Within the meaning of the invention, a hydraulic medium is preferably taken to mean oil, preferably gear oil.

In order to supply the vehicle gearbox with a hydraulic medium at high pressure, at least one high-pressure hydraulic pump is preferably provided. In this case, within the meaning of this invention, high pressure is taken to mean a hydraulic pressure of 5 bar or more, preferably of 10 bar or more, preferably of 25 bar or more and particularly preferably of 50 bar or more, and further of 300 bar or less, preferably of 175 bar or less, preferably of 100 bar or less and particularly preferably of 75 bar or less. Furthermore, a line for conducting the hydraulic medium at high pressure is preferably referred to as a high-pressure line. The high-pressure line is preferably arranged downstream on the side of a control valve which faces the high-pressure pump. In this case, downstream should, in particular, be taken to mean the direction from one of the hydraulic pumps via the control valve—in this case, this control valve may preferably be set up for pressure regulation—to the hydraulic actuator. A control valve of this kind should preferably be understood to mean a directional valve. Directional valves are known from the state of the art as longitudinal and rotary slide valves. More preferably, a directional valve of this kind is set up to connect different valve ports to one another selectively and preferably to regulate the pressure to which an actuator that can be controlled by the directional valve can be exposed.

In order to supply the vehicle transmission with a hydraulic medium at low pressure, at least one low-pressure hydraulic pump is preferably provided. In this case, within the meaning of this invention, low pressure is taken to mean a hydraulic pressure greater than 0 bar or more, preferably of 1 bar or more, preferably of 5 bar or more and particularly preferably of 7.5 bar or more, and further of 75 bar or less, preferably of 50 bar or less, preferably of 20 bar or less and particularly preferably of 10 bar or less. More preferably, the low-pressure hydraulic pump has a particularly large conveying volume. The volume flow that can be generated using the low-pressure hydraulic pump is preferably greater than the volume flow that can be generated with the high-pressure hydraulic pump, preferably 1.5 times as great or greater, more preferably twice as great or greater, preferably 5 times as great or greater and particularly preferably 10 times as great or greater. Furthermore, a line for conducting the hydraulic medium at low pressure is preferably referred to as a low-pressure line. The low-pressure line is preferably arranged downstream on the side of the control valve facing the low-pressure pump.

Within the meaning of the invention, a hydraulic tank for receiving the hydraulic medium from a return line should be understood to mean a container which is set up to receive and store a hydraulic medium. The hydraulic tank should preferably be understood to mean a hydraulic oil tank and preferably for the oil pump of a gearbox unit.

Within the meaning of the invention, a hydraulic control valve should be understood to mean a directional valve with at least three control positions and at least four valve ports. In the control positions, different valve ports can be selectively connected to one another in a fluid-conducting fashion by valve-internal lines. More preferably, the individual control positions can be achieved by moving a control piston in a valve housing. The control positions can preferably be reached by a longitudinal displacement of the control piston, preferably by a rotation. More preferably, with the control valve in at least one of its control positions, a pressure of the hydraulic medium can be regulated. More preferably, the control valve has at least four valve ports for connecting lines which are set up to conduct the hydraulic medium and at least three control positions, wherein the ports in the control positions can be selectively connected to one another.

According to the invention, in a first control position of the control valve, the high-pressure line can be connected to the oil supply port in a fluid-conducting fashion, in particular to regulate the actuating force of the hydraulic actuator.

More preferably, in a second control position, the low-pressure line can be connected to the oil supply port in a fluid-conducting fashion, in particular for pre-charging the hydraulic actuator. The hydraulic control is preferably provided for controlling at least one and preferably a plurality of hydraulic actuators, in particular of cylinders. Cylinders of this kind, in particular for actuating brakes or clutches, frequently cover a distance initially during actuation, in which practically no or only small amounts of force are to be applied, in particular to overcome play. When this play has been overcome, the hydraulic actuator applies the necessary actuating force. According to the invention, the hydraulic actuator is controlled by low pressure, particularly in order to overcome the play in the second control position of the control valve with the hydraulic medium.

More preferably, in a third control position the hydraulic actuator can be connected to the return line in a fluid-conducting fashion, in particular for the return flow of the hydraulic medium. In particular, a hydraulic control system of this kind makes it possible during actuation of the hydraulic actuator for a dead section of the actuator, in particular the clearance, so in particular the path from the opened position of a clutch or brake to the position where the friction linings are initially brought into abutment, to be quickly overcome by the feeding of the large volume flow from the low-pressure line (first actuation phase). And furthermore (second actuation phase), the hydraulic actuator is thereafter exposed to the high pressure from the high-pressure hydraulic line and the actuating force of the hydraulic actuator can thereby be controlled or regulated as required by the control valve. Through a hydraulic control system of this kind, the degree of effectiveness and therefore the efficiency can be further increased.

In a preferred embodiment, the control valve of the hydraulic control system is configured as a 6/3-way valve and therefore has six valve ports and three control positions. A valve of this kind allows a particularly simple design of the directional valve and therefore a high degree of operational reliability can be achieved.

In a preferred embodiment, the control valve is configured as a 5/3-way valve with five valve ports and three control positions. This 5/3-way valve preferably has two ports downstream on the side facing the hydraulic actuator and three valve ports on the side facing the high-pressure line. One of these three valve ports is preferably connectable to the high-pressure line, one to the low-pressure line and one to the return line. These two valve ports are preferably combined through hydraulic lines, preferably outside the control valve, into a common oil supply port for the hydraulic actuator. More preferably, one of these two valve connections is configured as a return port and the other as an oil supply port. In particular, with a 5/3-way valve as the control valve, it is possible for the control system according to the embodiment to be provided at low structural cost.

In a preferred embodiment, in at least one of the control positions of the control valve, two valve ports are connected downstream on the side of the high-pressure line to two valve ports on the side of the hydraulic actuator in a fluid-conducting fashion. Furthermore, in preferably at least two further control positions, only one of the valve ports is connected downstream on the side of the pressure line in a fluid-conducting fashion to only one of the valve ports on the side of the hydraulic actuator.

In this case, in the context of this invention, connecting valve ports on the two different sides of the control valve should be understood to mean that the valve connections are selectively connected to one another in a fluid-conducting fashion by the different control positions of the control valve. In particular, this kind of control valve as a directional valve makes it possible for a particularly simple and therefore also operationally reliable design of the hydraulic control system to be produced.

In a preferred embodiment, a non-return valve is arranged in at least one connection line downstream between the low-pressure line and the control valve, or else in the low-pressure line. This non-return valve is preferably arranged in such a manner as to prevent the backflow of hydraulic medium from the control valve into the low-pressure line.

In a preferred embodiment, in at least one connection line which is downstream between one of the valve ports and the oil-pressure supply port, a non-return valve is arranged. More preferably, this valve port is arranged in a manner connectable to the low-pressure line in a selectively fuel-conducting fashion and downstream on the side of the valve facing the hydraulic actuator. This non-return valve is preferably arranged in such a manner as to prevent the return flow of hydraulic medium from the control valve into the low-pressure line, i.e., from the oil pressure supply port to the aforementioned valve port.

In particular, when the high-pressure line and the low-pressure line are in fluidic connection to one another, it may be that the hydraulic medium does not reach the hydraulic actuator, but instead is forced into the low-pressure line and the actuating force of the actuator is thereby limited or reduced.

In a preferred embodiment, the control valve is configured as a 4/3-way valve. A control valve of this kind preferably has four valve ports and three control positions. More preferably, the control valve has a valve port downstream on the side facing the hydraulic actuator and three valve ports on the side facing the high-pressure line. In particular, through a valve of this kind a further simplified design of the hydraulic control system is made possible.

In a preferred embodiment, the control valve has three control positions and, furthermore, there is preferably a single valve port in each of these control positions, downstream on the side of the high-pressure line, which can be connected to a single valve port, downstream on the side of the hydraulic actuator. The through-flow through the other valve connections in each case is preferably blocked by the control valve for the hydraulic medium. Through an embodiment of the control valve of this kind, a particularly simple inner structure of the valve can be achieved and a high operational reliability can therefore be achieved.

In a preferred embodiment, the hydraulic actuator is configured as an actuating cylinder for a preferably frictional brake or clutch and, more preferably, a positive switching element with claws or teeth, preferably a claw coupling or sliding sleeve, in a motor vehicle gearbox. What is characteristic of brakes or clutches of this kind is that they are initially adjusted without the actuation cylinder having to apply a substantial actuating force for this purpose; this is particularly the case when it comes to overcoming the play between the friction linings. Particularly when this play is overcome, in other words the friction linings are brought into abutment, the actuating force required for the transmission of forces by the clutch or brake must be applied by the actuating cylinder. According to an embodiment of the invention, in a first movement phase the low-pressure line is connected by the control valve to the oil supply port, and in a second movement phase the high-pressure connection is additionally or alternatively connected to the oil supply port. This embodiment of the invention makes it possible, in particular, to expose the actuating cylinder to hydraulic medium at low pressure initially and then at high pressure, so that an improved hydraulic control system can be achieved.

In a preferred embodiment, the high-pressure and low-pressure hydraulic pumps are preferably configured in a shared housing and, more preferably, as a so-called dual-flow pump. More preferably, two separate hydraulic pumps are present, one of which is provided as a high-pressure pump and the other as a low-pressure pump. More advantageously, pumps of this kind have a shared drive and can be mechanically coupled to one another and, more advantageously, each of the two pumps has its own drive and these are then coupled to one another electronically.

Pumps of this kind are known from the state of the art. More preferably, a dual-flow pump of this kind has a low-pressure and a high-pressure region. In particular a dual-flow hydraulic pump makes a particularly space-saving design possible and an improved hydraulic control system can thereby be achieved.

The hydraulic control system according to an embodiment of the invention can be operated by an operating method which involves at least the following steps for actuation of the hydraulic actuator:

moving the control valve into a control position (second control position) initially for pre-charging the hydraulic actuator, in which the low-pressure line is connected in a fluid-conducting fashion to the oil supply port and thereafter, and transferring the control valve into a further control position (first control position) for regulating the actuating force for the hydraulic actuator, in which the high-pressure line is at least connected to the oil supply port in a fluid-conducting fashion.

Particularly through these steps, an efficiency increase is made possible, as the pre-charging of the hydraulic actuator by way of the low-pressure hydraulic medium can be achieved and the actuating force by the high-pressure hydraulic medium.

In a preferred embodiment, the control valve is configured as an electrically actuatable directional valve. In this directional valve, the first control position, in respect of the displacement path of the directional valve for adopting the different control positions, is arranged between the second and the third control position. In order to actuate the control valve, so in particular to change the control position, an electrical current flows through an electrical actuating mechanism of the control valve. An electrical pre-charging current, in particular for actuating the directional valve and for effecting the pre-charging of the hydraulic actuator, preferably flows through this actuating mechanism. More preferably, this pre-charging current is greater than an electrical pressure-regulating current. This pressure-regulating current is, in particular, provided for operating the directional valve and for effecting regulation of the actuating force of the hydraulic actuator. In particular, with a method of this kind, particularly low currents are necessary and the design of the hydraulic control system is thereby simplified.

In a preferred embodiment of the method, the control valve is configured as an electrically actuatable directional valve and the second control position, in respect of a displacement path of the directional valve for adopting the different control positions, is arranged between the first and the third control position. More preferably, the electrical pre-charging current for actuating the directional valve and for effecting the pre-charging of the hydraulic actuator is smaller than the electrical pressure-regulating current, for actuating the directional valve and for effecting regulation of the actuating force of the hydraulic actuator. In particular, due to an arrangement of the hydraulic control system of this kind and of the method for the operation thereof, a particularly robust regulation of the hydraulic actuator is made possible.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1A:
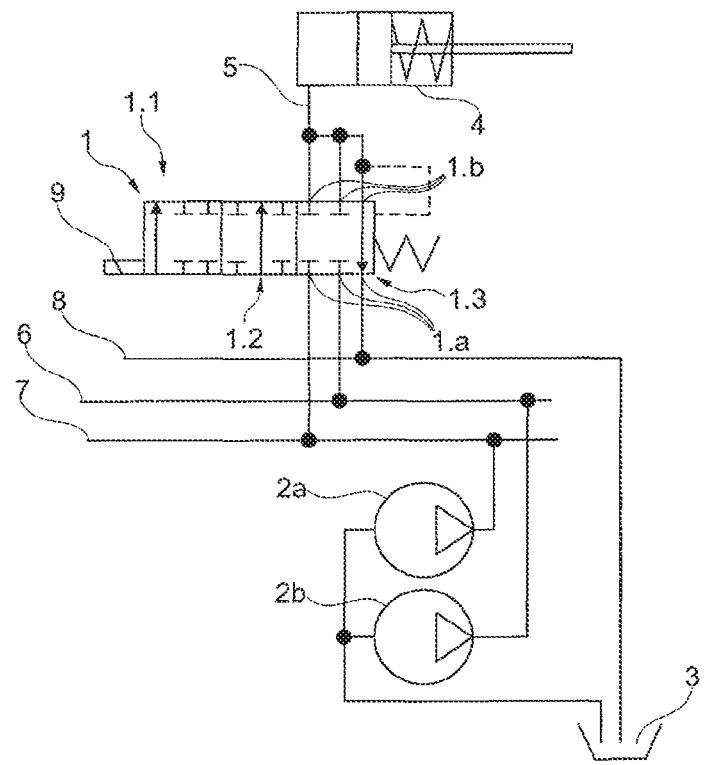
FIG. 1A is a schematic view of a hydraulic control system with a first embodiment of a control valve.

FIG. 1A shows a schematic circuit diagram of the hydraulic control system according to the invention. In this case, the high-pressure line 7 is supplied with hydraulic oil by the high-pressure hydraulic pump 2a. The high-pressure hydraulic pump 2a draws the hydraulic oil out of the hydraulic tank 3. The low-pressure hydraulic pump 2b, which likewise draws the hydraulic oil out of the hydraulic tank 3, is provided to supply the low-pressure line 6. From the hydraulic actuator 4, depicted in this case as a single-acting hydraulic cylinder, the hydraulic oil is fed via the oil supply port 5 and the return line 8 back into the hydraulic tank 3.

The control valve 1 is provided to control the hydraulic actuator 4. The control valve 1 has three control positions 1.1, 1.2, 1.3 and six valve ports 1.a, 1.b; consequently, the control valve 1 is configured as a 6/3-way valve.

The control valve 1 can be actuated via an electrical actuating device 9. In order to actuate the control valve 1, an electrical current flows through the actuating device 9 and the control valve 1 can be controlled by influencing this current.

In the first control position 1.1, the high-pressure line 7 is connected in a fluid-conducting fashion to the oil supply port 5 of the hydraulic actuator 4 by the control valve 1. The remaining valve ports of the control valve 1 are closed in this control position, so that no oil through-flow is possible. In the second control position 1.2, the low-pressure line 6 is connected in a fluid-conducting fashion to the oil supply port 5 of the hydraulic actuator 4. The other valve ports are closed in this control position. In the third control position 1.3, the oil supply port 5 of the hydraulic actuator 4 is connected to the return line 8 in a fluid-conducting fashion.

In order to implement the control method according to the invention, the hydraulic actuator 4 is initially supplied with hydraulic oil from the low-pressure line 6, the so-called pre-charging or first actuation phase. For the pre-charging, the control valve 1 is located in the control position 1.2 and the hydraulic actuator moves without applying a noticeable actuating force.

The low-pressure hydraulic pump 2b is configured to supply the low-pressure line 6 in such a manner that the low-pressure line 6 has a high conveying volume at low pressure. In this way, it is on the one hand achievable for the pre-charging of the hydraulic actuator 4 to run particularly quickly and only a small amount of energy is required for this.

After pre-charging, the control valve is moved into the control position 1.1 (second actuating phase). In the control position 1.1, the high-pressure line 7 is connected to the oil supply port 5 of the hydraulic actuator 4. The high-pressure hydraulic pump 2a is configured in such a manner that although it only produces a small conveying volume, it can build up a high pressure. This high pressure means that the hydraulic actuator 4 can apply a sufficient actuating force and therefore a friction brake or a friction clutch, in which the transferrable torque depends on the actuating force, can be applied for gear-changing in a vehicle gearbox.

Figure 1B:
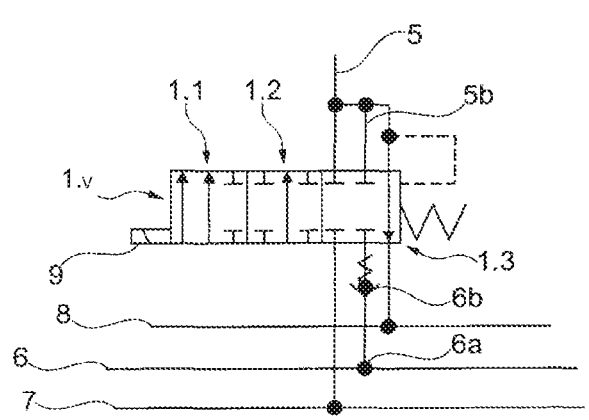
FIG. 1B is a schematic view of a second embodiment of a control valve.

FIG. 1B shows a further embodiment of a control valve 1 (variant 1.v) in a schematic form. The control valve 1.v has three control positions 1.1, 1.2, 1.3. In the first control position 1.1, both the high-pressure line 7 and also the low-pressure line 6 are connected in a fluid-conducting fashion to the oil supply port 5, and the remaining valve ports are closed. In order to prevent an overflow of hydraulic oil from the high-pressure line 7 into the low-pressure line 6, a return valve 6b is arranged in the connection line 6a. In this case, the return valve 6b is arranged in such a manner that an oil flow from the low-pressure line 6 to the hydraulic actuator 4 is made possible and blocked in the opposite direction. Alternatively, a return valve may also be arranged between the oil pressure supply port 5 and one of the valve ports 1b in the connection line 5b.

In the second control position 1.2, only the low-pressure line 6 is connected in a fluid-conducting fashion to the oil supply port 5, and the other valve ports are closed. In the control settings 1.3, the oil supply port 5 is connected to the return line 8 in a fluid-conducting manner, and the remaining valve ports are closed. The control valve 1.v can be operated and controlled by the electrical actuating device 9.

Figure 2A:
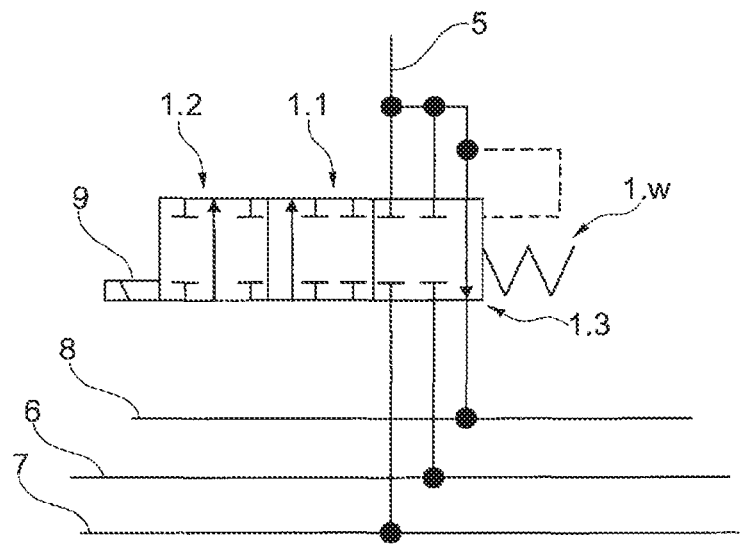
FIG. 2A is a schematic view of a third embodiment of a control valve.

FIG. 2A shows a further embodiment of the control valve 1 (variant 1.w) for the hydraulic control system in a schematic form. The control valve 1.w can be actuated and controlled via the electrical actuating device 9. The control position 1.1 for connecting the high-pressure line 7 to the oil supply port 5 is arranged between the control position 1.2 and the control position 1.3. In the control position 1.2, the low-pressure line 6 is connected to the oil supply port 5, and the other valve connections are closed.

In the control position 1.3, the oil supply port 5 is connected to the return line 8 in a fluid-conducting fashion, and the other valve ports are closed.

Figure 2B:
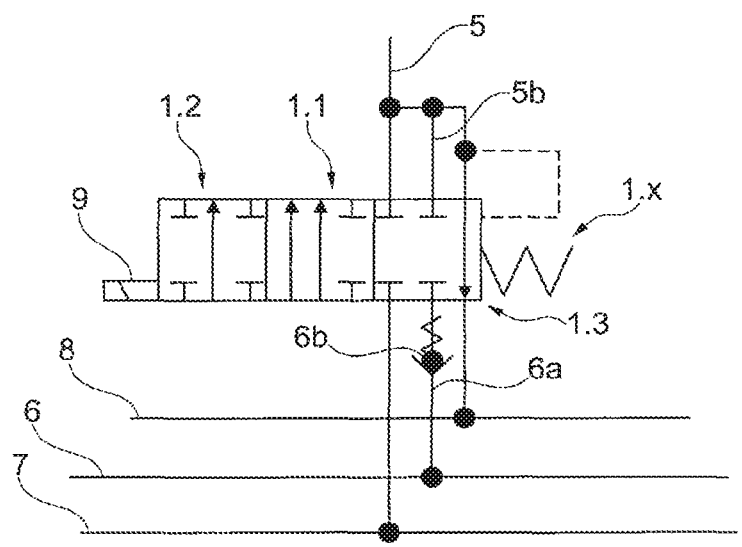
FIG. 2B is a schematic view of a fourth embodiment of a control valve.

A further embodiment of the control valve 1 (variant 1.x) for the hydraulic control system is shown in FIG. 2B. In this case, a return valve 6b is arranged in the connection line 6a for connecting the low-pressure line 6 to the control valve 1.x. Alternatively, a return valve can also be arranged between the oil-pressure supply connection 5 and one of the valve connections 1b in the connection line 5b.

The return valve 6b prevents hydraulic oil from flowing back out of the high-pressure line 7 via the control valve 1.x in the control position 1.1 into the low-pressure line 6. The return valve 6b only allows an oil flow from the low-pressure line 6 to the oil supply port 5.

In the control setting 1.1, both the low-pressure line 6 and also the high-pressure line 7 are connected to the oil supply port 5 in a fluid-conducting fashion, and a particularly rapid pre-charging of the hydraulic actuator 4 (not shown) is thereby made possible. The other valve ports are closed.

Figure 3A:
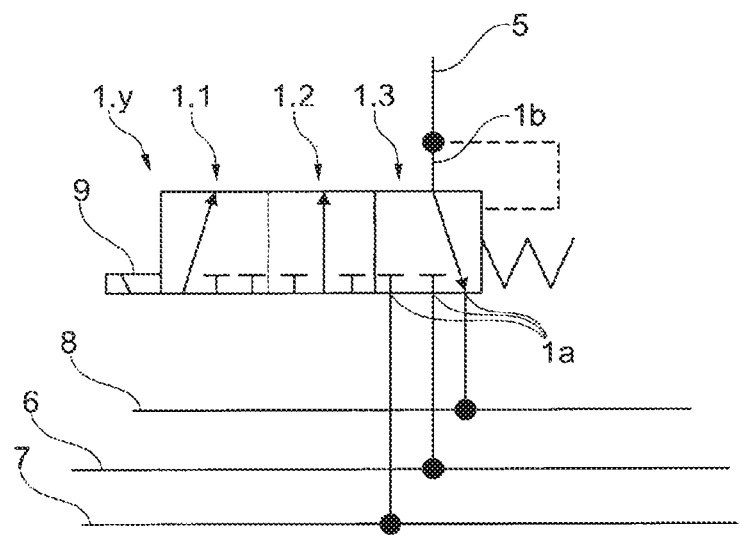
FIG. 3A is a schematic view of a fifth embodiment of a control valve.

A further variant of a control valve 1 (variant 1.y) of a hydraulic control system is depicted in a schematic form in FIG. 3A. The control valve 1.y has three control positions 1.1, 1.2, 1.3. Furthermore, the control valve 1.y can be actuated and controlled via the electrical actuation device 9.

The control valve 1.y has only one valve port 1b on the downstream side facing the oil supply port 5 and therefore the hydraulic actuator 4 (not shown). On the opposite side, in other words on the downstream side of the control valve 1.y facing the high-pressure line 7, the control valve 1.y exhibits three valve ports 1a. In this way, the control valve 1.y is configured as a 4/3-way valve.

In the first control position 1.1, the high-pressure line 7 is connected in a fluid-conducting fashion to the oil supply port 5, and the other valve connections are closed. In the second control position 1.2, the low-pressure line 6 is connected in a fluid-conducting fashion to the oil supply port 5, and the remaining valve ports are closed. In the third control position 1.3, the oil supply port 5 is connected in a fluid-conducting fashion to the return line 8, and the remaining valve ports are closed. The control valve 1.y has only a small number of valve ports 1a, 1b and a particularly simple design of the hydraulic control system can therefore be achieved.

Figure 3B:
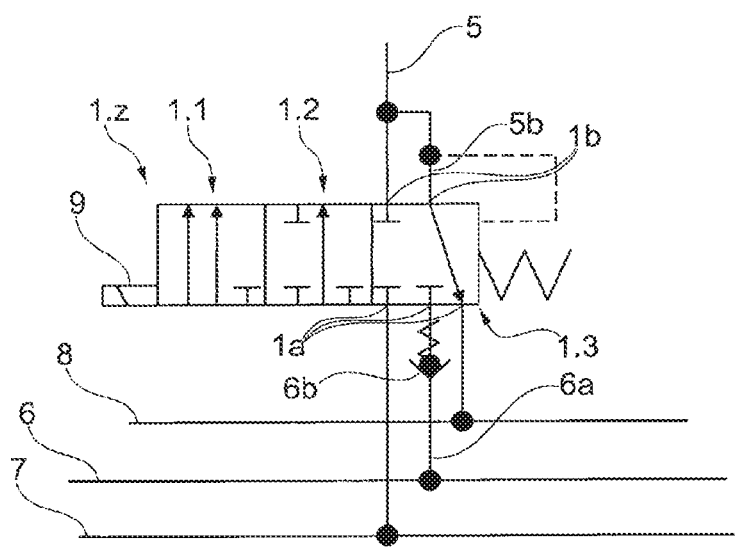
FIG. 3B is a schematic view of a sixth embodiment of a control valve.

FIG. 3B shows a further variant of the control valve (variant 1.z). The control valve 1.z has three control positions 1.1, 1.2, 1.3 and five valve ports 1a, 1b. The control valve 1.z is configured as a 5/3-way valve. In the first control position 1.1, both the high-pressure line 7 and also the low-pressure line 6 are connected in a fluid-conducting fashion to the oil supply port 5, and the remaining valve connections are closed. On the side facing the oil supply port 5 upstream, the control valve 1.z has two valve ports 1b. On the downstream side facing the high-pressure line 7, the control valve 1.z has three valve ports 1a.

The return valve 6b is arranged in the connection line 6a which is arranged between the low-pressure line 6 and the control valve 1.z, in order to prevent hydraulic oil from the high-pressure line 7 from overflowing into the low-pressure line 6 in the first control position 1.1. Alternatively, a return valve may also be arranged between the oil-pressure supply port 5 and one of the valve ports 1b in the connection line 5b. The control valve 1.z has an electrical actuating device 9, via which the control valve 1.z can be actuated and controlled.

Figure 4A:
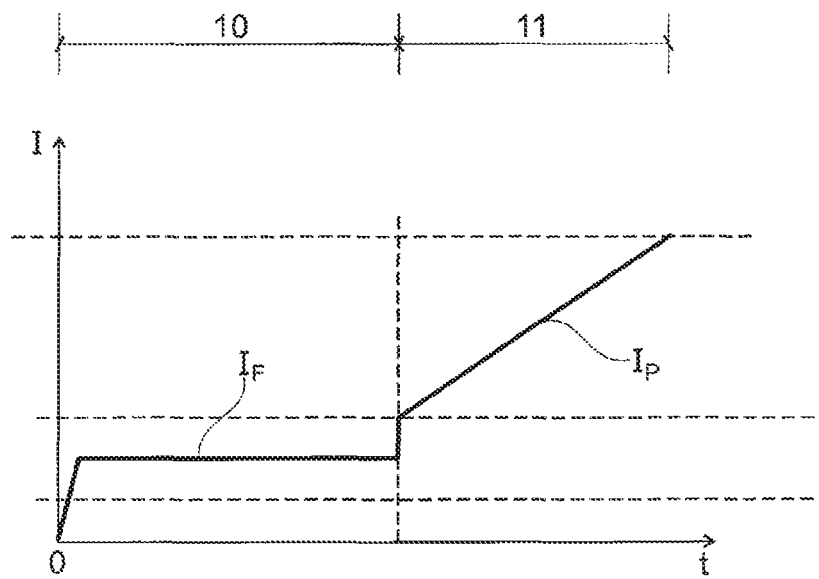
FIG. 4A is a diagram illustrating the energization of the control valve with a low pre-charging current.

In FIG. 4A, the current I is plotted against time t during actuation of the electrical actuation device 9 for control valves. In order to pre-charge the hydraulic actuator 4 in the first actuation phase 10, the pre-charging current IF is necessary. In order to regulate the actuating force, in a second phase of the actuation 11, the pressure-regulating current IP is applied. It is clear that the pressure-regulating current IP is greater than the pre-charging current IF. In this case, the profile of the pressure-regulating current IP should be regarded as exemplary. However, this is in any event greater than the pre-charging current IF. A relationship of this kind between the currents IF and IP is in particular provided for the control valve, as is shown in FIG. 1A and FIG. 1B, in which the control position 1.2 for the pre-charging of the hydraulic actuator is arranged between the control position 1.1 and the control position 1.3, with respect to the displacement path of the control valve.

Figure 4B:
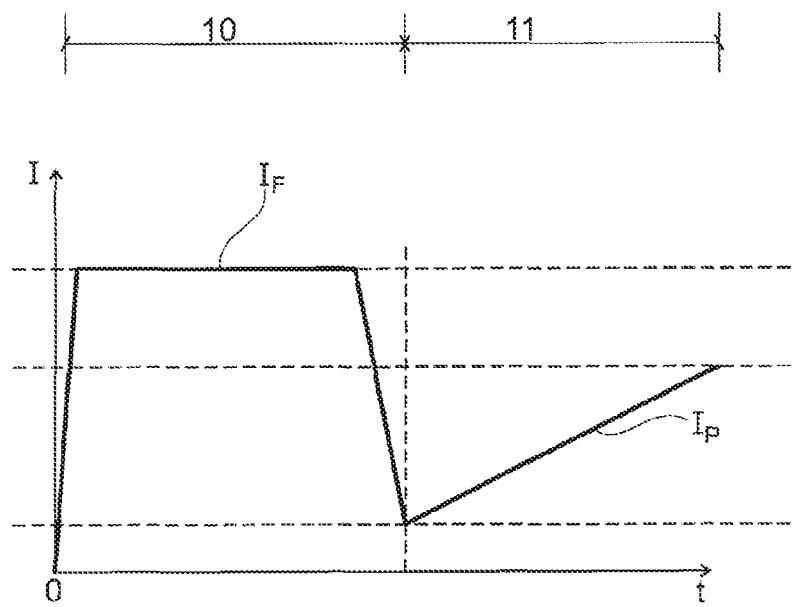
FIG. 4B is a diagram illustrating the energization of the control valve with a high pre-charging current.

In FIG. 4B, on the other hand, the relationship between the currents IF and IP for control valves, as depicted in FIG. 2A and FIG. 2B, are shown. In control valves of this kind, the control position 1.1 between the control position 1.2 and the control position 1.3, relative to the displacement path of the control valve, is arranged. In this case, the profile of the pressure-regulating current IP is in turn to be regarded as exemplary (second actuating phase 11). However, the pre-charging current IF in the first actuating phase 10 is in any event greater than the pressure-regulating current IP during the pre-charging of the hydraulic actuator.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hydraulic control system for a vehicle gearbox, comprising:
    a hydraulic actuator actuatable by a hydraulic medium;
    an oil supply port;
    a high-pressure hydraulic pump for supplying to a high-pressure line;
    a low-pressure hydraulic pump for supplying to a low-pressure line;
    a hydraulic tank for receiving the hydraulic medium from a return line; and
    a hydraulic control valve with at least three control positions and at least four valve ports, wherein
    in a first control position, the high-pressure line is connected to the oil supply port in a fluid-conducting fashion,
    in a second control position, the low-pressure line is connected to the oil supply port in a fluid-conducting fashion, and
    in a third control position, the hydraulic actuator is connected to the return line in a fluid-conducting fashion.

2. The hydraulic control system according to claim 1, wherein the control valve is configured as a 6/3-way valve with six valve ports and three control positions.

3. The hydraulic control system according to claim 1, wherein
    the control valve is configured as a 5/3-way valve with five valve ports and three control positions, and
    the control valve has two valve ports downstream on a side facing the hydraulic actuator and three valve ports on a side facing the high-pressure line.

4. The hydraulic control system according to claim 1, wherein
    the control valve is configured as a 4/3-way valve with four valve ports and three control positions, and
    the control valve has a valve port downstream on a side facing the hydraulic actuator and three valve ports on a side facing the high-pressure line.

5. The hydraulic control system according to claim 1, wherein
    in at least one control position of the control valve, two valve ports are connected in a fluid-conducting fashion downstream on a side of the high-pressure line to two other valve ports which are on a side of the hydraulic actuator, and
    in at least two further control positions, only one of the valve ports is connected downstream on a side of the high-pressure line in a fluid-conducting fashion to one of the valve ports on a side of the hydraulic actuator.

6. The hydraulic control system according to claim 4, wherein
    in one control position of the control valve, two valve ports are connected in a fluid-conducting fashion downstream on a side of the high-pressure line to two other valve ports which are on a side of the hydraulic actuator, and
    in two other control positions, only one of the valve ports is connected downstream on a side of the high-pressure line in a fluid-conducting fashion to one of the valve ports on a side of the hydraulic actuator.

7. The hydraulic control system according to claim 1, further comprising:
    a return valve arranged in a connection line downstream between the low-pressure line and the control valve, in order to prevent a backflow of the hydraulic medium from the control valve into the low-pressure line.

8. The hydraulic control system according to claim 6, further comprising:
    a return valve arranged in a connection line downstream between the low-pressure line and the control valve, in order to prevent a backflow of the hydraulic medium from the control valve into the low-pressure line.

9. The hydraulic control system according to claim 1, further comprising:
    a return valve arranged in a connection line downstream between the low-pressure port and the control valve, in order to prevent a backflow of the hydraulic medium from the control valve into the low-pressure line.

10. The hydraulic control system according to claim 6, further comprising:
    a return valve arranged in a connection line downstream between the low-pressure port and the control valve, in order to prevent a backflow of the hydraulic medium from the control valve into the low-pressure line.

11. The hydraulic control system according to claim 1, wherein
    the control valve has three control positions,
    a single valve port in each of the three control positions, downstream on a side of the high-pressure line, is connected to a single valve port, downstream on a side of the hydraulic actuator, and
    a through-flow for the hydraulic medium through the other valve ports is prevented.

12. The hydraulic control system according to claim 7, wherein
    the control valve has three control positions,
    a single valve port in each of the three control positions, downstream on a side of the high-pressure line, is connected to a single valve port, downstream on a side of the hydraulic actuator, and
    a through-flow for the hydraulic medium through the other valve ports is prevented.

13. The hydraulic control system according to claim 1, wherein the hydraulic actuator is configured as an actuating cylinder for a frictional or positive clutch or brake in a motor vehicle gearbox.

14. The hydraulic control system according to claim 12, wherein the hydraulic actuator is configured as an actuating cylinder for a frictional or positive clutch or brake in a motor vehicle gearbox.

15. The hydraulic control system according to claim 1, wherein the low-pressure and the high-pressure hydraulic pumps are configured as a dual-flow pump with a low-pressure and a high-pressure region.

16. The hydraulic control system according to claim 1, wherein
- in the first control position, the high-pressure line is connected to the oil supply port to regulate an actuating force of the hydraulic actuator, and/or
- in the second control position, the low-pressure line is connected to the oil supply port to pre-charge the hydraulic actuator, and/or
- in the third control position, the hydraulic actuator is connected to the return line for a return flow of the hydraulic medium.

17. A method for operating a hydraulic control system for a vehicle gearbox, the hydraulic control system including:
- a hydraulic actuator actuatable by a hydraulic medium;
- an oil supply port;
- a high-pressure hydraulic pump for supplying to a high-pressure line;
- a low-pressure hydraulic pump for supplying to a low-pressure line;
- a hydraulic tank for receiving the hydraulic medium from a return line; and
- a hydraulic control valve with at least three control positions and at least four valve ports, the method comprising the acts of:
- for actuation of the hydraulic actuator, initially moving the control valve into a first control position for pre-charging the hydraulic actuator, in which the low-pressure line is connected in a fluid-conducting fashion to the oil supply port; and
- thereafter switching the control valve into a second control position for regulating an actuating force for the hydraulic actuator, in which the high-pressure line is at least connected to the oil supply port in a fluid-conducting fashion.

18. The method according to claim 17, further comprising the acts of:
- configuring the control valve as an electrically actuatable directional valve;
- arranging the first control position, in respect of a displacement path of the directional valve for adopting the at least three control positions, between the second control position and a third control position, where in the third control position, the hydraulic actuator is connected to the return line in a fluid-conducting fashion for a return flow of the hydraulic medium; and
- configuring such that an electrical pre-charging current, for actuating the directional valve and for effecting the pre-charging of the hydraulic actuator, is greater than an electrical pressure-regulating current for actuating the directional valve and for effecting control of the actuating force of the hydraulic actuator.

19. The method according to claim 17, further comprising the acts of:
- configuring the control valve as an electrically actuatable directional valve;
- arranging the second control position, in respect of a displacement path of the directional valve for adopting the at least three control positions, between the first and the third control position, where in the third control position, the hydraulic actuator is connected to the return line in a fluid-conducting fashion for a return flow of the hydraulic medium; and
- configuring such that an electrical pre-charging current, for actuating the directional valve and for effecting the pre-charging of the hydraulic actuator, is smaller than an electrical pressure-regulating current for actuating the directional valve and for effecting control of the actuating force of the hydraulic actuator.

* * * * *